United States Patent [19]

Cheng

[11] Patent Number: 4,795,601
[45] Date of Patent: Jan. 3, 1989

[54] METHOD OF MANUFACTURING METALLIZED THERMOPLASTIC FLOWER POT COVER

[75] Inventor: Sheng-Chi Cheng, 6th Floor-5, No. 61, Chung Cheng Third Road, Kaohsiung 80027, Taiwan

[73] Assignees: Sheng-Chi Cheng; Robert Mann; Robert Mann Packaging, Inc., Gilroy, Calif.

[21] Appl. No.: 87,461

[22] Filed: Aug. 19, 1987

[51] Int. Cl.⁴ .............................................. B29C 43/04
[52] U.S. Cl. ...................................... 264/138; 47/58; 47/72; 264/132; 264/156; 264/237; 264/322
[58] Field of Search ............... 47/58, 72, 84; 264/322, 264/342 R, 299, 318, 319, 320, 325, 327, 138, 132, 156, 237, 348; 425/384, 403

[56] References Cited

U.S. PATENT DOCUMENTS 2,845,735 8/1958 Werner .................................. 47/72
4,216,620 8/1980 Weder et al. ......................... 47/72
4,390,489 6/1983 Segal .................................... 264/322

FOREIGN PATENT DOCUMENTS 2489126 3/1982 France .................................. 47/72

*Primary Examiner*—Jan H. Silbaugh
*Assistant Examiner*—Jill L. Heitbrink
*Attorney, Agent, or Firm*—Phillips, Moore, Lempio & Finley

[57] ABSTRACT

The present invention pertains to an improved method for rapidly forming a decorative container for use as a covering for a similarly shaped object, which method comprises:

(a) providing a thin sheet of metallized thermoplastic heat shrinkage polymer material;
(b) optionally imprinting a design or other matter upon the sheet of polymer;
(c) optionally cutting said sheet to the dimensions approximating the dimensions of the base and side walls of said object;
(d) placing the sheet over a heated form having a temperature of between about 80° and 110° C.
(e) placing a complementary heated form also having a temperature of between about 80° and 110° C.
(f) fitting the heated forms of substep (d) and (e) together having the thermoplastic sheet therebetween;
(g) maintaining the temperature of between about 80° and 100° C. between the forms for between 1 and 10 minutes until said sheet folds under the influence of the heat within the space between form and its complementary form;
(h) removing the formed container from the heated form; and
(i) cooling the formed shaped object which retains its shape without chemical adhesive or mechanical supports. Preferably, the polymer material is a metallized heat shrinkable polyvinylchloride.

8 Claims, 4 Drawing Sheets

METHOD OF MANUFACTURING METALLIZED THERMOPLASTIC FLOWER POT COVER

BACKGROUND OF THE INVENTION

1. Field of the Invention

The present invention relates to a covering for a container. More specifically, it pertains to a preformed decorative form of a container which is particularly useful for partially enclosing a flower containing vessel, such as for commercial or domestic exhibit.

2. Description of Related Art

Generally, flower pots will have a dish or drainage dish underneath to support the pot and to collect excess drainage water. Generally, a flower pot of red clay, plastic, or the like is generally not considered to be decorative.

In the past some attempts have been made to provide a pleasing covering for a flower pot.

In U.S. Pat. No. 4,170,168, R. P. Adams discloses a method to form a flower pot cover using a sheet of thermoplastic polymer. In this method an imprinted sheet is positioned within a heater at elevated temperatures of between about 250° and 350° F. in a vacuum, maintaining the sheet within the heated environment for between 1 to 10 minutes until the sheet folds under the influence of the heat, removing the sheet from the heater, and cooling it in a spray of coal water until it reaches ambient temperatures.

The method of Adams has a number of drawbacks. The temperature of 230°-350° F. is well above the boiling point of water and is difficult to maintain. The time of 1 to 10 minutes practically guarantees that the method will not be used for a common mass production of a preformed flower pot cover. The need for a vacuum introduces another degree of technical complexity.

In U.S. Pat. No. 4,271,116, W. R. Jones discloses the method of making a composite structure upon a solid shape by placing the form together with the composite within, raising the temperature of the mold to melt the former and expand it such that it consolidates the composite within the mold. This method is best used for a fiberglass fiber/solid being cast into a shape using a separately added thermoplastic resin.

Other U.S. patents of general interest include U.S. Pat. Nos. 2,355,559; 3,185,502; 3,318,748; and 3,466,214.

None of the above art individually or combined in any fashion or configuration teach, disclose or suggest the present invention.

Therefore it is the principal object of this invention to provide a preformed decorative metallized polymeric container for supporting a potted plant and to cover and to provide a decorative appearance for the ceramic or plastic pot. This flower pot cover also provides an additional feature for collection of any moisture draining from the flower pot.

It is another object of the present invention to provide a method of forming a thermoplastic metallized polymeric flowerpot cover without the use of a vacuum, at a fairly low temperature and within a relatively short time. The present invention is extremely useful in the rapid production of preformed flower pot covers.

These and other objects of the present invention will become apparent to those skilled in this art by the description herein and by examining the accompanying drawings.

SUMMARY OF THE INVENTION

The present invention relates to an improved method for rapidly forming a metallized polymeric decorative container for use as a covering for a similarly shaped object, which method comprises:

(a) providing a thin sheet of metallized thermoplastic polymer material;

(b) optionally imprinting a design or other matter upon the sheet of polymer;

(c) optionally cutting said sheet to the dimensions approximating the dimensions of the base and side walls and flare above the side wall of said object;

(d) placing the sheet over a heated form having a temperature of between about 80° and 110° C.;

(e) placing a complementary heated form also having a temperature of between about 80° and 110° C.;

(f) fitting the heated forms of substep (d) and (e) together having the thermoplastic sheet therebetween;

(g) maintaining the temperature of between about 80° and 110° C. between the forms for between 1 and 60 seconds until said sheet folds under the influence of the heat within the space between the form and its complementary form;

(h) removing the formed container from the heated form; and (i) cooling the formed shaped object which retains its shape without chemical adhesive or mechanical support.

DETAILED DESCRIPTION OF THE INVENTION AND PREFERRED EMBODIMENTS

As used herein:

"Optionally" means that a particular component, aspect of step may or may not be present or occur in the present invention. It is the operator's choice whether the component or step is included in the overall process.

Various types of thermoplastic materials were originally considered useful for the invention. Such materials in the categories of vinyl films of an acrylate, a cellulose acetate, a vinyl acetate, a polyester, polyethylene, polyvinyl alcohol, vinyl acetate, polypropylene, urethane, and polyvinyl chloride. However, when these materials are metallized with a thin metallic film, the useful temperatures for forming objects changes dramatically.

A complete description of the thermoplastic poly(vinylchloride) films suppliers and their technology is found in "Vinyl Polymers (PVC) Poly(vinylchloride)" by John A. Davidson et al., in *Kirk Othmer: Encyclopedia of Chemical Technology*, (3rd ed.), Vol. 23, John Wiley and Sons, New York, pp 886 to 936, published in 1983; in "Film and Sheeting Materials", by E. Lea Crump in *Kirk-Othmer: Encyclopedia of Chemical Technology*, (3rd ed.), Vol. 10, John Wiley and Sons, New York, pp. 216 to 246, published in 1980, both of which are incorporated herein by reference.

The thermoplastic poly(vinylchloride) film having a thickness of between 1 mil and 10 mil is commercially available from film suppliers in the United States and throughout the world. Preferably, the thermoplastic film is obtained from B. F. Goodrich, Inc. of Akron, Ohio, or Tenneco Chemicals, Inc. of Houston, Tex., or Air Products and Chemicals of Allentown, Pa. More preferably, the film is obtained (by special order) as NANSHARP theremoplastic P.V.C. polymer film from NAN YA Plastic Corporation, 201 Tun Hwa North Road, of Taipei, Taiwan, Republic of China, [telephone: 07-7122211, Telex: 11246 PLASTICORP TAIPEI]. The thermoplastic is also heat shrinkable, preferably between 5 and 15%.

The NANSHARP thermoplastic P.V.C. film is obtained as metallized on one side (with aluminum, between about 0.1 and 1 mil, preferably about 0.25 mil.) The aluminum coating is applied in conventional coating manner, i.e. as in thermodeposition.

The NANSHARP film is also available available having on the other side a colored coating. The color coating is available in a number of colors, red, blue, yellow, green, white and the like and is applied in a conventional coating manner, i.e. as a permanent ink. The color coating is usually betwen about 0.1 and 1 mil in thickness, preferably 0.25 mil.

Figure 1:
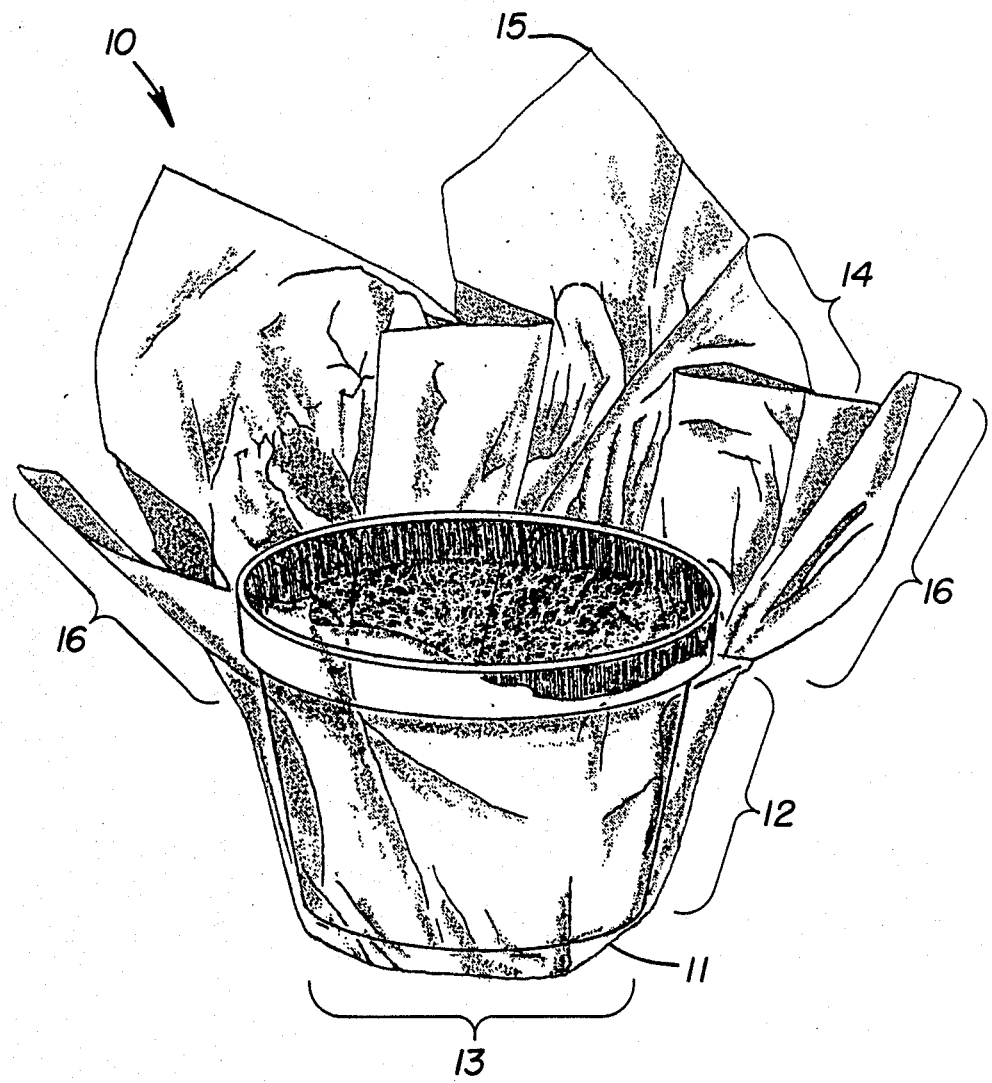
FIG. 1 provides a perspective side view of one of the formed decorative flower pot covers of the invention.
Figure 2:
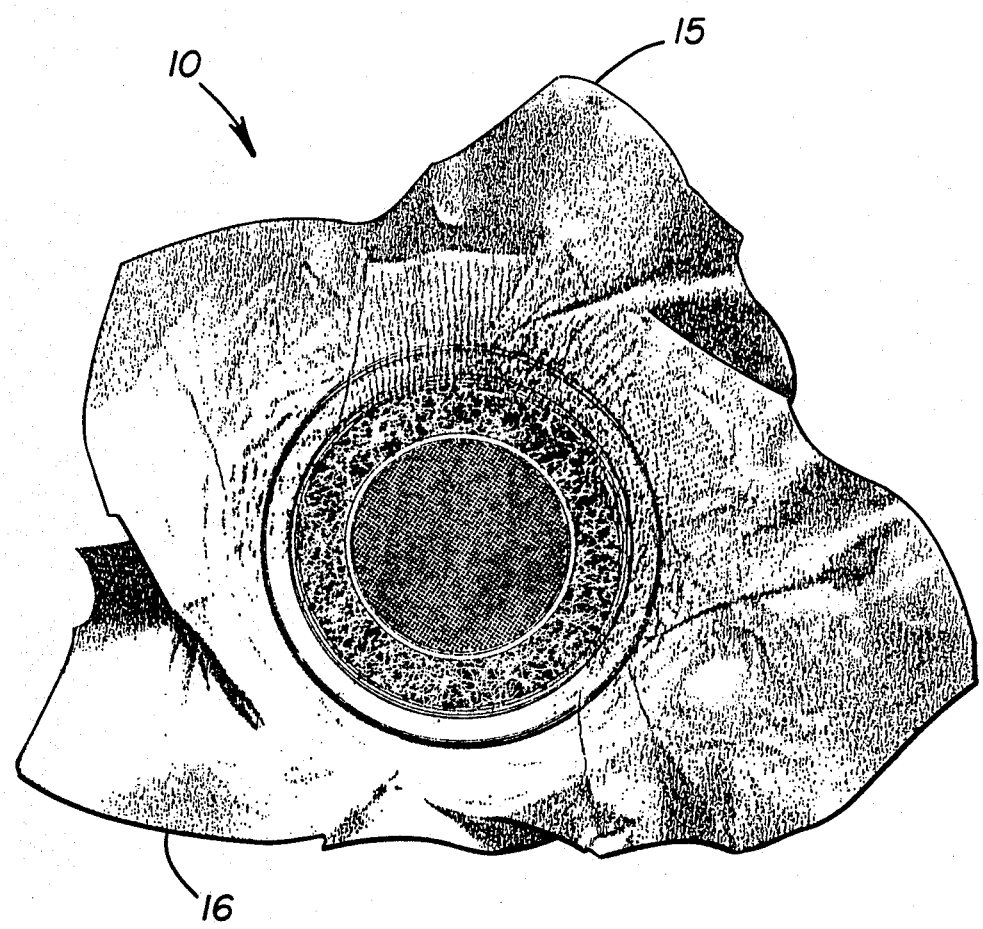
FIG. 2 furnishes a top plan view of the flower pot cover of FIG. 1.

In referring to the drawing and particularly FIGS. 1 and 2, I describe a decorative container 10 of the present invention which is formed having a base portion 11 and a continuous upwardly angled sidewall 12 around the periphery 13 of base portion 11 being integrally formed extending from the base 11. The container, or flower pot cover, in being formed has side wall 12 which includes a series of random folds and shown at area 14. These folds are naturally produced during the formation of the flower pot cover 10 by the method of the present invention. In addition, a series of upwardly disposed points, as shown at 15, and optionally flared outwardly (flare 16) are naturally formed into the configuration of the container because the container is molded from a single substantially square or rectangular sheet of the flat thermoplastic material.

Figure 3:
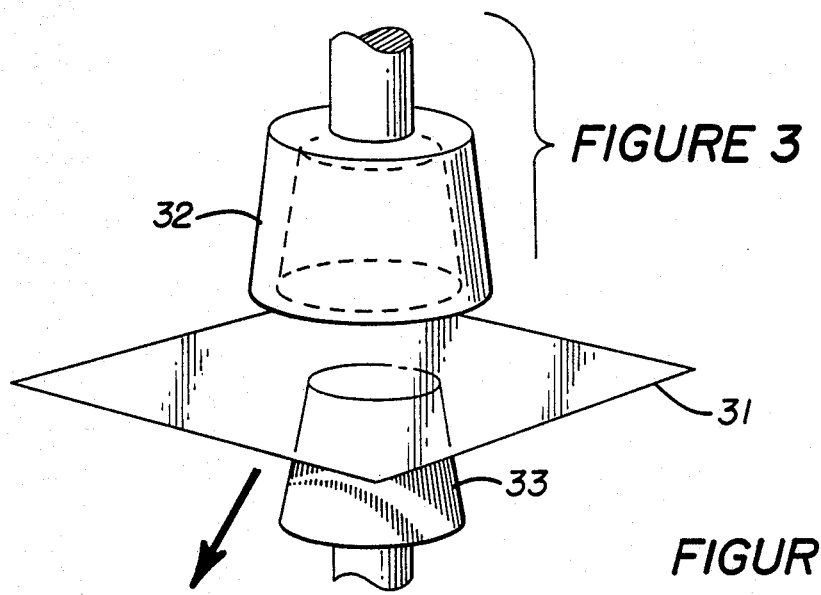
FIG. 3 shows the first view of a schematic step diagram showing the sequence of the procedures used in the performance of the method of the present invention in forming the flower pot cover. It shows in perspective the upper mold, thermoplastic sheet and lower mold.
Figure 4:
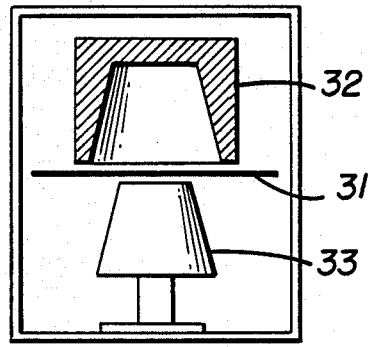
FIG. 4 shows a cutaway side view of FIG. 3.

As is shown in FIG. 3, the first schematic view of the steps used in the method of forming the decorative container of the present invention. As shown in FIGS. 3 and 4, a substantially square sheet of thermoplastic material 31 is arranged to be between heated top form 32 (female) and complimentary bottom heated form 33 (male). In this embodiment, the bottom form 33 is in the shape of a truncated cone so that the finished thermoplastic container will generally have a similar appearance (ordinary flower pot) when finished. The positions of the two forms can usually be reversed without impairing the invention.

Figure 5:
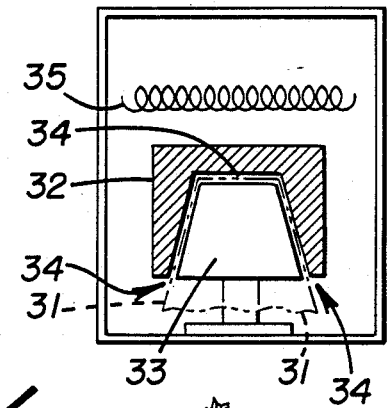
FIG. 5 shows a cutaway side view of the molds combined upon each other with the thermoplastic sheet therebetween.
Figure 6:
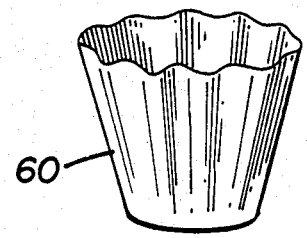
FIG. 6 shows a perspective view of the cooled preformed container (flower pot cover). It may include a flare edge.
Figure 7:
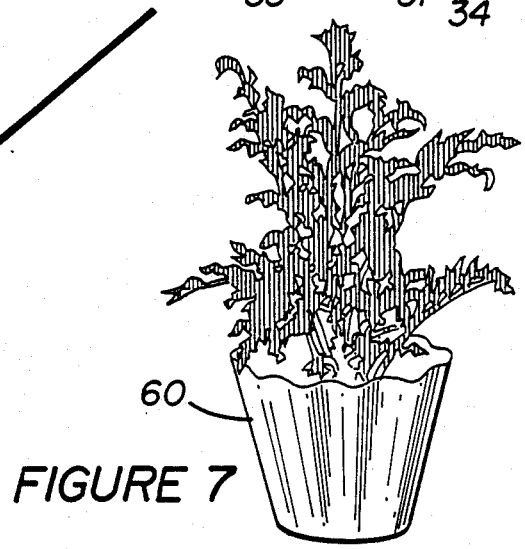
FIG. 7 shows a perspective view of the decorative preformed flower pot cover having a potted flower therein.

A rectangular or square sheet of thermoplastic material is shown. The thermoplastic sheet is preferably a single layer of material, preferably plasterized theremoplastic poly(vinylchloride), which provides the structure for the flower pot cover. The metallized coating nor the color coating have enough structural integrity to provide the structure for the shape of the cover. It is apparent that the edge of the sheet may be cut in any shape (e.g., circular, serrated) to provide a desired design on the edge of the finished flower pot cover. After sheet 31 is placed on heated (male) form 33, and complimentary form 32 is adjusted to provide a small heated volume 34 between the forms. The heated volume 34 (heater 35) also contains the thermoplastic sheet 31. Because the two heated forms are used, the operating temperature is much lower than the temperatures described in the art. Generally, temperatures of between about 80° and 100° C. (180°-212° F.) are used in the present invention. It is not necessary that both forms can be at the same temperature. Preferably, temperatures of less than the boiling point of water (100° C.), are used. Temperatures of the molds 32 and 33 of between about 85° and 90° C. have been found to be particularly useful. At these temperatures, a sheet 31 of thermoplastic material, such as one which is between about 0.1 and 0.001 inches in thickness will take a minute or less (preferably between 1 second and 1 minute) to soften and fold inwardly between forms, and ambient pressure (no vacuum) is used for this entire process. In the next sequence step as shown in FIGS. 4 and 5 of the drawing, the added heat produces the plasticity of the sheet. At this stage, the flower pot cover has generally an inverted shape of the type shown in FIG. 1. Thereafter, shaped formed container 60 is removed from the heated forms to cool as shown in FIG. 6. Optionally, cooling air or cooling water may be used. Since the temperature of the forms is usually below 100° C., air is generally all that is necessary to cool the flower pot cover in its preformed shape. optionally the edge of the cover is trimmed and is ready for the insertion of a potted plant as shown in FIG. 7.

Not all thermoplastics are useful in this invention as is seen in Table 1 below, to mass produce thermoplastic containers. The metallized poly(vinylchloride) having heat shrinking properties of preferred 5 to 20 percent heat shrinkage, especially 5 to 15%.

Additional physical characteristics, for Example G of Table 1, include metallized (alluminum coated) P.V.C. (Brand NANSHARP) include, glass transition temperature (Tg) 75°-105° C., elongation at breakage 40-80%, tensile strength at break 6,000-7,500 psi. Additional properties for polymeric film especially poly(vinylchloride) are found in the *Modern Plastics Encyclopedia* published annually by McGraw-Hill Publishing Co., of New York, N.Y.

TABLE 1

TESTING OF THERMOPLASTIC SHEETS TO PRODUCE A METALLIZED PREFORMED FLOWER POT COVER

| EX/ | FILM | THICKNESS, (MIL) | TEMPERATURE, °C. | TIME (SECONDS) | COMMENT |
| --- | --- | --- | --- | --- | --- |
| A/ | Low Density Polyethylene (LDPE) | 2 | 70 to 100 | 3 | Not able to form into Pot Cover shape. |
| B/ | High Density Polypropylene (HDPE) | 2 | 70 to 100 | 3 | Not able to form into Pot Cover shape. |
| C/ | Inflated Polypropylene (PP) | 2 | 75 to 95 | 3 | Not able to form into Pot Cover shape. |
| D/ | Laminated with LDPE | 2 | 80 to 95 | 4 | Not able to form into Pot Cover shape. |
| E/ | Poly(vinylchloride) (PVC) without heat shrinkage | 2 | 80 to 95 | 4 | Not able to form into Pot Cover shape. |
| F/ | PVC heat shrinkable | 2 | 60 to 80 | 5 | Can form into Pot Cover but not in good shape. |
| G/ | PVC of heat shrinkage plus metallized | 2 | 85 to 90 | 4 | Creates good shape of Pot Cover and proper flare angle, free from flare sagging, and can secure good sealing without glue. |

As is seen in the last step of the sequence of FIG. 7, the decorative flower pot cover 10 of the present invention provides either a partial or full covering for the clay pot. In this way the metallized flower pot cover of the present invention provides a colored or other generally pleasing container that surrounds the clay pot and improves the general appearance of the plant itself. This decorative container is also useful to collect any drainage or water falling from the potted plant.

In another aspect of the invention, the sheet may also be embossed with a design which it retains after being heat formed into a container shape, such as a flower pot cover.

Figure 8:
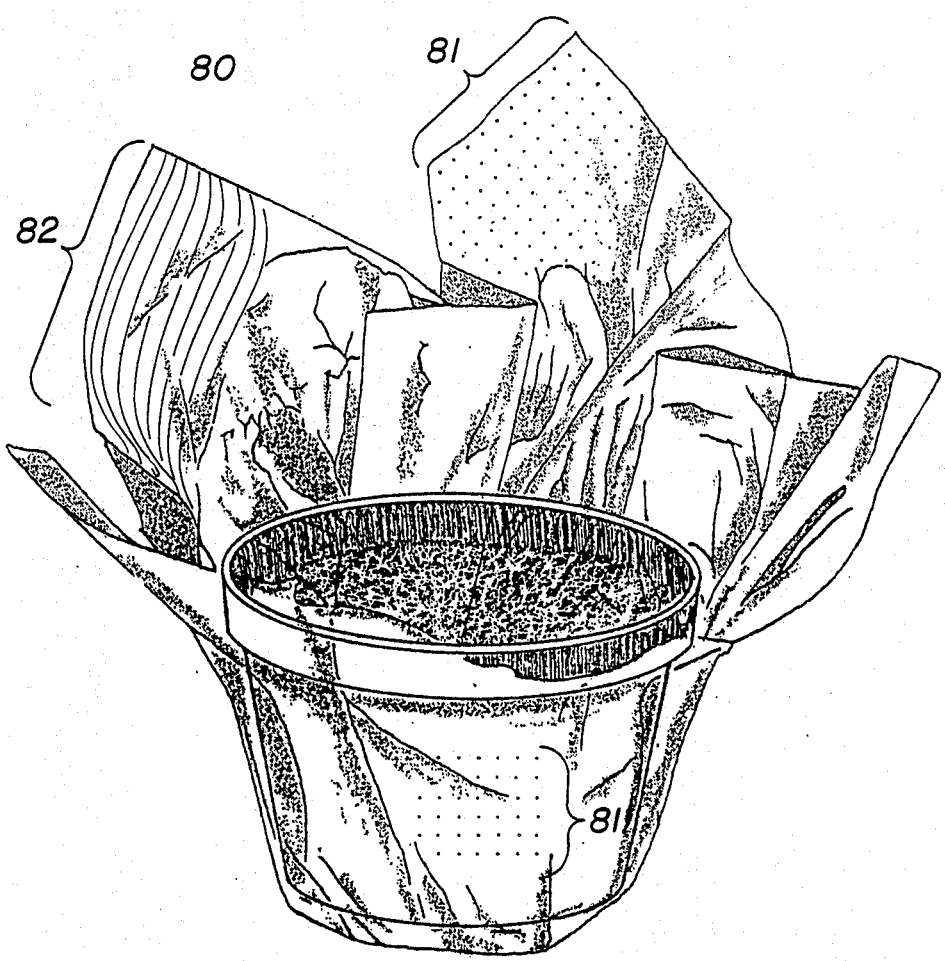
FIG. 8 shows a perspective view of FIG. 1 having a pattern of microholes on the sides and flare of the formed flower pot cover and also shows an embossed region.

FIG. 8 shows a perspective side view of the flowerpot cover 80 having a pattern of micropunched hole 81. The holese may also be on the bottom of the formed flower pot cover. FIG. 8 also shows an embossed area 82 which provides an attractive design to the pot cover. The embossed area may be over the entire cover and be a stipple effect, a weave, a dot-pattern, a wood grain or the like to provide a decorative effect. Embossing and micropunched holes may be present in the same pot cover. In other words, the sheet prior to thermal treatment may be micropunched with a number or a pattern of small holes. The pattern of holes is both decorative and useful. The holes allow for water to escape and not accumulate. Too much water provides an environment where undesirable fungi, algae, and other plant diseases to thrive. Also the holes allow for gases such as oxygen, ethylene and the like to escape. Ethylene is generated by plants and is a factor in undesirable rapid blooming, premature aging, and then withering of the decorative plant. The holes are usually about 0.01 to 0.5 square inches in area. They may be randomly scattered or in a regular pattern. Preferably, there are about 5–100 holes (especially 16) per square inch.

While some of the embodiments of the present invention have been shown as is described herein, it will be apparent to those skilled in the art of decorative metallized thermoplastic containers that various modifications and changes can be made in the process of producing flower pot covers, without departing from the spirit and scope of the present invention. All such modifications and changes coming within the scope of the appended claims are intended to be covered thereby.

I claim:

1. An improved method for rapidly forming a metallized thermoplastic polyvinyl chloride decorative container for use as a covering for a similarly shaped object, which method comprises:
   (a) providing a thin sheet of between about 0.01 and 0.001 inches of metallized thermoplastic polyvinyl chloride;
   (b) imprinting or embossing a design or other matter upon the sheet of metallized polyvinyl chloride;
   (c) cutting said sheet to the dimensions approximating the dimensions of the base and side walls of said object;
   (d) placing the sheet over a heated form having a temperature of between about 85° and 90° C.;
   (e) placing a complementary heated form also having a temperature of between about 85° and 90° C. above the sheet;
   (f) fitting the heated form and the heated complementary form of substep (d) and (e) together having a space for the thermoplastic sheet therebetween;
   (g) maintaining the temperature of between about 85° and 90° C. between the forms for between about 3 to 5 seconds until said sheet folds under the influence of the heat within the space between the form and the complementary form;
   (h) removing the formed container from the heated form; and
   (i) cooling the formed container which retains its shape without chemical adhesive or mechanical support.

2. The method of claim 1 wherein metallized polyvinylchloride has heat shrinkable properties.

3. The method of claim 2 wherein the decorative container is a preformed flower decorative pot cover.

4. An improved method for rapid mass production of a decorative container for use as a partial container covering for a similarly shaped object, which method comprises:

(a) providing a sheet of between about 0.01 and 0.001 inch of metallized thermoplastic polymer material of metallized polyvinylchloride;

(b) imprinting a design or other matter upon the sheet of polymer material;

(c) arranging said imprinted sheet upon a form of desired shape;

(d) cutting said sheet to the dimensions approximating the dimensions of the base and side walls of the similarly shaped object;

(e) placing the sheet over a heated form having a temperature of between about 80° and 90° C.;

(f) placing a complementary heated form having a temperature of between about 80° and 90° C. above the sheet;

(g) fitting the heated forms of substep (e) and (f) together having a space for the thermoplastic sheet therebetween;

(h) maintaining the temperature between the forms at between 3 and 5 seconds until said sheet folds under the influence of the heat within the space between the heated form and the complementary heated form;

(i) removing the formed decorative container from the heated form; and (j) cooling the formed decorative container.

5. The method of claim 4 wherein the metallized polyvinylchloride has heat shrinkable properties.

6. The method of claim 5 wherein the decorative container of step (j) is a formed flower pot cover.

7. In a method for rapidly forming a thin metallized decorative container for an object, the improvement wherein a thin metallized thermoplastic polymer sheet of polyvinyl chloride of between about 0.01 and 0.001 inch is provided of a size to approximate the outer dimensions of said object followed by:

(a) placing the sheet over a heated form having a temperature of between about 85° and 90° C.;

(b) placing a complementary-shaped heated form having a temperature of between about 85° and 90° C. above the sheet;

(c) fitting the heated forms of step (A) and (B) together having the thermoplastic sheet therebetween;

(d) maintaining the temperature of between about 85° and 90° C. between the forms between about 2 and 6 seconds until the heated sheet folds under the influence of the heat within a space between the forms of step (a) and (b);

(e) removing the heated formed container from the heated forms; and (f) cooling the formed container which retains its shape without chemical adhesives or mechanical support.

8. An improved method for rapidly forming a metallized thermoplastic polyvinyl chloride decorative container for use as a covering for a similarly shaped object, which method comprises:

(A) providing a thin sheet of between about 0.01 and 0.001 inches of metallized thermoplastic polyvinyl chloride;

(B) placing the sheet over a heated form having a temperature of between about 85° and 90° C.;

(C) placing a complementary heated form also having a temperature of between about 85° and 90° C. above the sheet;

(D) fitting the heated forms of substep (B) and (C) together having a space for the thermoplastic sheet therebetween;

(E) maintaining the temperature of between about 85° and 90° C. between the forms for between about 3 and 5 seconds until said sheet folds under the influence of the heat within the space between the form and the complementary form;

(F) removing the formed container from the heated forms; and (G) cooling the formed container which retains its shape without chemical adhesive or mechanical support.

* * * * *